(12) United States Patent
Chidambaram

(10) Patent No.: US 9,729,922 B2
(45) Date of Patent: Aug. 8, 2017

(54) AUTOMATIC SELF-HELP VIDEO PLAYBACK FOR SET-TOP BOX TROUBLESHOOTING

(71) Applicant: Verizon Patent and Licensing Inc., Arlington, VA (US)

(72) Inventor: Vijay Anand Chidambaram, Chennai (IN)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 12 days.

(21) Appl. No.: 14/477,987

(22) Filed: Sep. 5, 2014

(65) Prior Publication Data
US 2016/0073159 A1    Mar. 10, 2016

(51) Int. Cl.
| | |
|---|---|
| *H04N 7/10* | (2006.01) |
| *H04N 21/4425* | (2011.01) |
| *H04N 21/432* | (2011.01) |
| *H04N 17/04* | (2006.01) |
| *H04N 21/234* | (2011.01) |
| *H04N 21/478* | (2011.01) |
| *H04N 21/658* | (2011.01) |
| *H04N 21/81* | (2011.01) |

(52) U.S. Cl.
CPC ....... *H04N 21/4425* (2013.01); *H04N 17/045* (2013.01); *H04N 21/234* (2013.01); *H04N 21/4325* (2013.01); *H04N 21/478* (2013.01); *H04N 21/6581* (2013.01); *H04N 21/8173* (2013.01)

(58) Field of Classification Search
None
See application file for complete search history.

(56) References Cited

U.S. PATENT DOCUMENTS

| | | | | |
|---|---|---|---|---|
| 6,463,586 B1* | 10/2002 | Jerding | ............... | H04N 5/44543 348/E5.105 |
| 7,373,415 B1* | 5/2008 | DeShan | ............... | H04L 12/2697 709/231 |
| 2001/0037505 A1* | 11/2001 | Lee | ....................... | H04N 17/004 725/60 |
| 2002/0162116 A1* | 10/2002 | Read | ................. | H04L 29/06027 725/106 |
| 2004/0019691 A1* | 1/2004 | Daymond | .......... | H04N 7/17309 709/231 |
| 2008/0183705 A1* | 7/2008 | Shivaji-Rao | ......... | H04N 17/004 |
| 2009/0064251 A1* | 3/2009 | Savoor | ................ | G06F 11/2294 725/110 |
| 2009/0244290 A1* | 10/2009 | McKelvey | ............. | H04N 7/173 348/181 |
| 2010/0070867 A1* | 3/2010 | Lemmers | ................ | G06F 21/36 715/735 |
| 2011/0107389 A1* | 5/2011 | Chakarapani | ...... | H04N 7/17318 725/132 |
| 2011/0163888 A1* | 7/2011 | Goedde | .................. | H04N 17/04 340/815.45 |

(Continued)

*Primary Examiner* — Fernando Alcon

(57) ABSTRACT

A set-top box (STB) determines an occurrence of a first STB error during operation of the STB, and identifies a first error code that corresponds to the first STB error. The STB maps the first error code to a first self-help video of multiple self-help videos stored at the STB, and plays back the first self-video via a display device coupled to the STB.

20 Claims, 9 Drawing Sheets

(56) References Cited

U.S. PATENT DOCUMENTS

| | | | |
|---|---|---|---|
| 2011/0206136 A1* | 8/2011 | Bekedam | G06F 11/3664 375/240.25 |
| 2011/0225619 A1* | 9/2011 | Kesireddy | H04N 7/173 725/115 |
| 2011/0235577 A1* | 9/2011 | Hintermeister | G06F 17/30876 370/328 |
| 2012/0054785 A1* | 3/2012 | Yang | H04H 60/32 725/16 |
| 2012/0108230 A1* | 5/2012 | Stepanian | G06F 21/10 455/422.1 |
| 2012/0151549 A1* | 6/2012 | Kumar | H04N 17/004 725/131 |
| 2012/0198020 A1* | 8/2012 | Parker | H04W 12/08 709/217 |
| 2012/0222081 A1* | 8/2012 | Schaefer | H04N 17/04 725/132 |
| 2013/0081097 A1* | 3/2013 | Park | H04N 21/44222 725/131 |
| 2015/0058909 A1* | 2/2015 | Miller | H04N 21/4425 725/132 |

\* cited by examiner

US 9,729,922 B2

AUTOMATIC SELF-HELP VIDEO PLAYBACK FOR SET-TOP BOX TROUBLESHOOTING

BACKGROUND

Set-top boxes are typically used in content networks for receiving digital content delivered over the network, such as a fiber optical cable network, and for processing the received digital content for presentation via a display device coupled to the set-top boxes. When problems with the operation of the set-top boxes occurs, the set-top box user usually does not know how to fix the problem themselves, and must telephone a call center to either have a call center agent troubleshoot the problem over the phone, or to have a technician visit their home to fix the problem in person.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Exemplary embodiments described herein use a self-help widget installed in a set-top box to determine the occurrence of a set-top box error, and to identify the error with a corresponding error code. The self-help widget can map the identified error code to a self-help video (or other type of media) that may be retrieved from memory, and automatically played back via the set-top box. The self-help video provides instructions on troubleshooting the set-top box error such that a call to a call center agent, or an in-person technician visit, is not needed to resolve the error.

Figure 1:
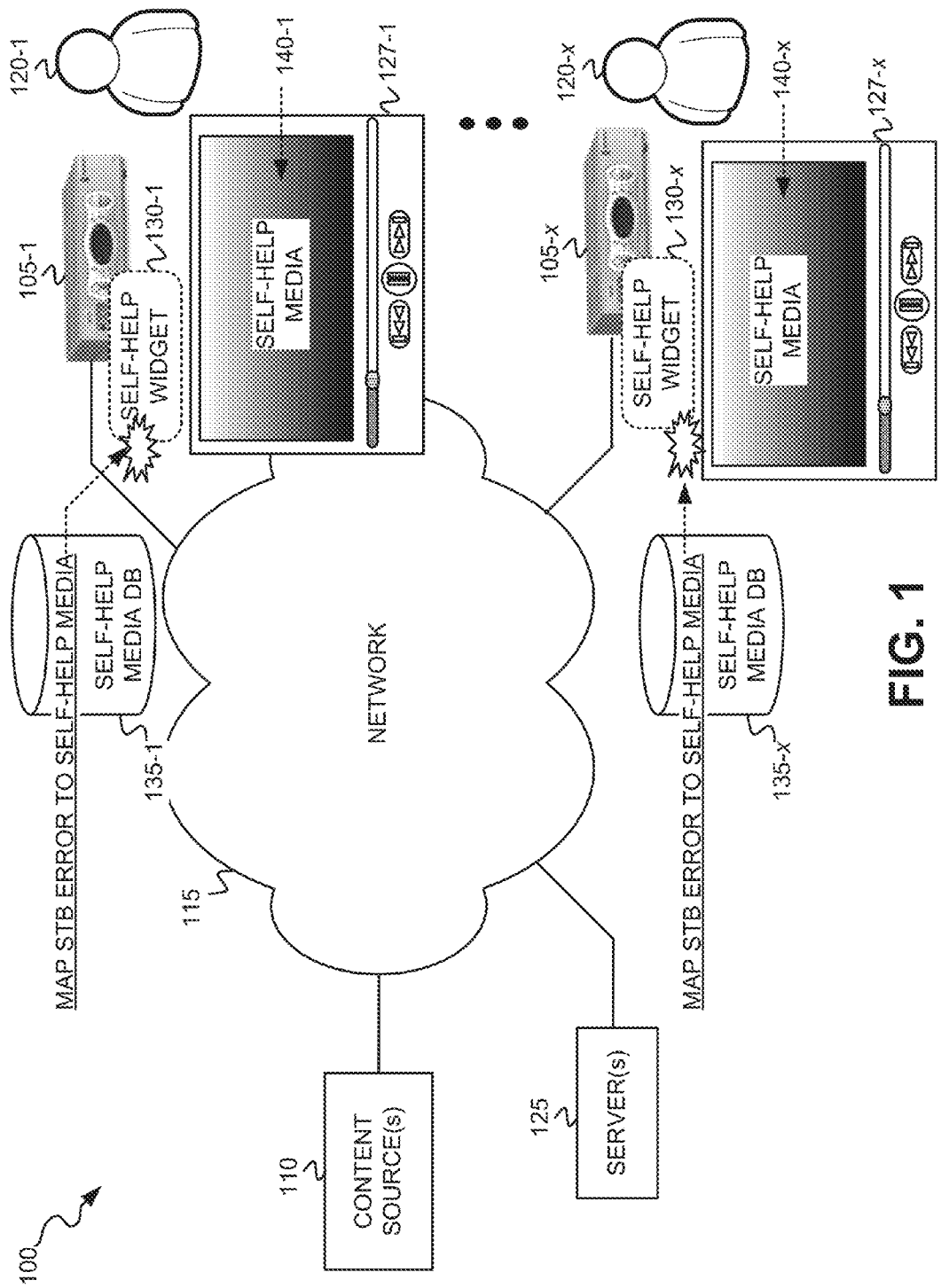
FIG. 1 depicts an overview of an exemplary network environment in which set-top boxes automatically play self-help videos based on errors identified at the set-top boxes.

FIG. 1 depicts an overview of an exemplary network environment 100 in which set-top boxes (STBs) play back self-help videos based on errors identified at the STBs. Network environment 100 may include multiple STBs 105-1 through 105-x (where x is a positive integer greater than 1) which receive content from a content source(s) 110 via a network 115. Content source(s) 110 may include one or more network devices that each deliver selected content to STBs 105-1 through 105-x (generically and individually referred to herein as a "STB 105") for presentation to a respective customer 120-1 through 120-x via a respective display device 127-1 through 127-x (generically and individually referred to here as a "display device 127").

STB 105 may, for example, receive the content from content source(s) 110 via one or more channels (e.g., Quadrature Amplitude Module (QAM) channels, Internet Protocol (IP) streams, etc.) over network 115. The content may include, for example, text, images, audio, video content and/or television (TV) video programs. Network 115 may include one or more networks of various types including, for example, a cable network (e.g., an optical cable network), a satellite network, or an Advanced Television Systems Committee (ATSC) standards-based network (e.g., over the air (OTA) network). Network 115 may, in some implementations, include one or more QAM channels (or other types of modulated or broadcast channels) for delivering content and Electronic Program Guide (EPG) data to STB 105. Network 115 may additionally include other networks of various types including, for example, a Public Switched Telephone Network (PSTN), a wireless network, a local area network (LAN), a wide area network (WAN), a metropolitan area network (MAN), an intranet, or the Internet. The wireless network may include a satellite network, a Public Land Mobile Network (PLMN), or a wireless LAN or WAN (e.g., Wi-Fi).

STBs 105-1 through 105-x may download, from server(s) 125, respective self-help widgets 130-1 through 130-x (generically and individually referred to herein as a "self-help widget 130"), and may install them at STBs 105-1 through 105-x. Self-help widget 130 may include program instructions that implement functionality for determining an occurrence of a STB error at the STB, identifying the STB error, and automatically playing back one of multiple self-help media based on the identified STB error. STBs 105-1 through 105-x may additionally download, from server(s) 125, self-help media and may store it in respective self-help media database (DBs) 135-1 through 135-x (generically and individually referred to here as a "self-help media DB 135"). The self-help media may include multiple media items that each includes troubleshooting instructions for correcting an identified error at STB 105. For example, each item of self-help media may include a user interactive video that includes text, audio and video instructions for correcting the identified STB error.

Self-help media DB 135 may, in one implementation, include a network device that further includes memory for storing a data structure, such as self-help media DB 135. In another implementation, DB 135 may be stored in a memory of STB 105. DB 135 may store self-help videos that may be retrieved by self-help widget 130 at STB 105. Details of one exemplary data structure of DB 135 is described with respect to FIG. 4 below. Server(s) 125 may include one or more network devices that store a current version of self-help widget 130 and new/updated versions of self-help media, and which permits the download of widget 130 and the self-help media by STBs 105-1 through 105-x.

Upon the occurrence of an error at STBs 105-1 through 105-x, a self-help widget 130 at a respective STB 105 may map the identified STB error to an item of self-help media stored in DB 135, and may play back the retrieved self-help media 140-1 through 140-x (generically and individually referred to herein as "self-help media 140") via a respective display device 127-1 through 127-*x*. The user 120 may listen to and/or view the played back self-help media 140, following the trouble shooting instructions contained therein, to correct or resolve the identified STB error. The error at STB 105 may include any type of error involving the operation of STB 105. The error at STB 105 may include, for example, an error involving the EPG received at STB 105, an error or problem involving the digital video recorder (DVR) STB 105, an error involving a picture or other content not being available at STB 105.

The configuration of network components of network environment 100 illustrated in FIG. 1 is for illustrative purposes only. Other configurations may be implemented. Network environment 100 may include additional, fewer and/or different components than those depicted in FIG. 1.

Figure 2:
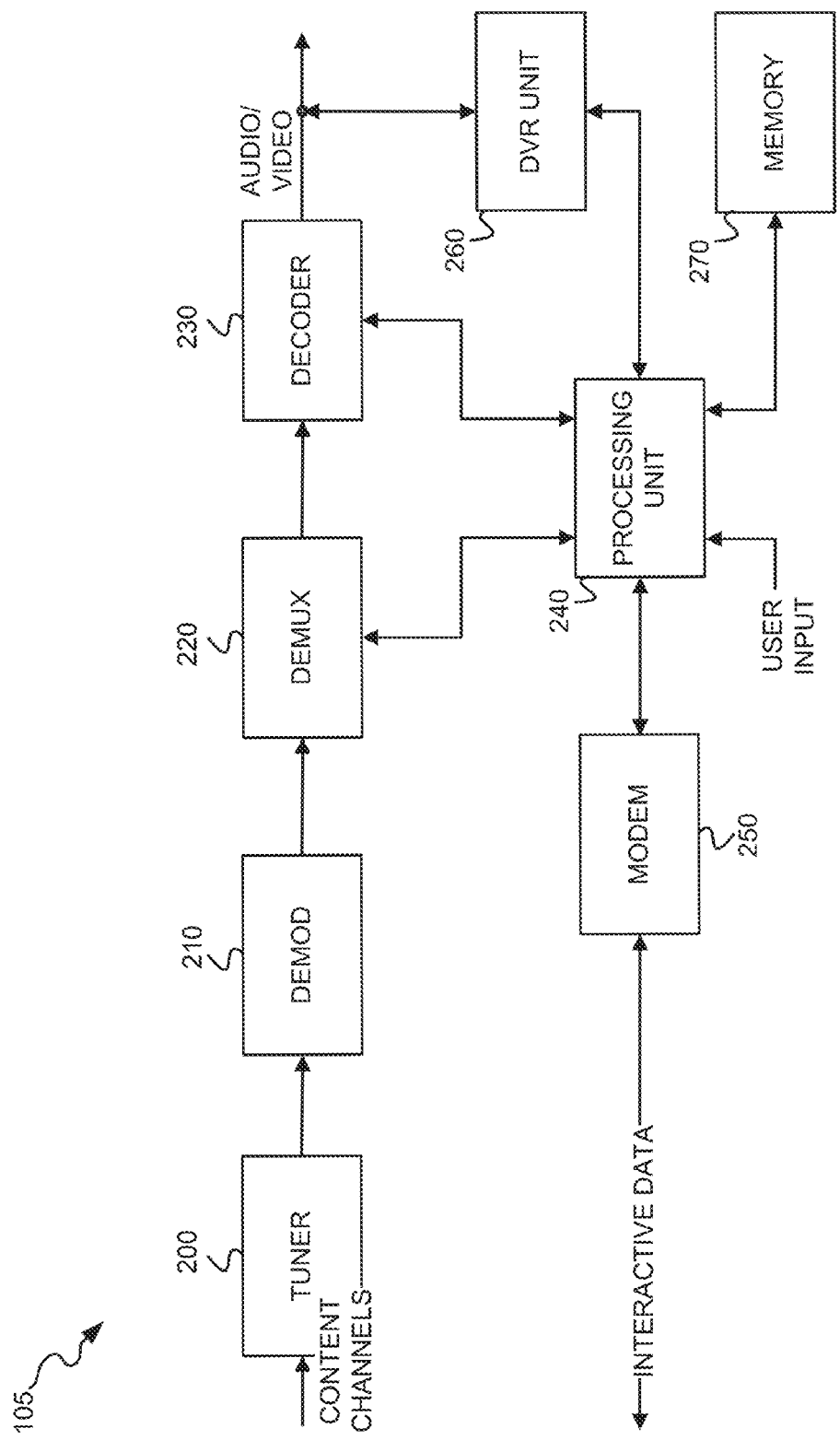
FIG. 2 depicts exemplary components of a set-top box of FIG. 1.

FIG. 2 depicts exemplary components of STB 105, STB 105 may include a tuner 200, a demodulator 210, a demultiplexer 220, a decoder 230, a processing unit 240, a modem 250, a DVR unit 260, and a memory 270. These components may include circuitry configured to receive content via network 115 and provide the content for presentation via display 127 coupled to STB 105. Tuner 200 may select and tune to specific broadcast television information by tuning to one of many different input channels. Each channel may be digitally modulated using, for example, QAM, though other types of modulation may be used. Demodulator 210 may demodulate the information in the channel selected by tuner 200 to produce a transport stream (e.g., MPEG-2 or MPEG-4 transport stream) containing the audio, video and/or other information related to a selected TV program.

Demultiplexer 220 may select and decrypt compressed audio and video from the transport stream for the particular TV program that the customer 120 or device user wishes to watch. Decoder 230 may decode and decompress the decrypted audio and video information for the selected TV program. Processing unit 240 may include, for example, a microprocessor that controls the operations performed by tuner 200, demodulator 210, demultiplexer 220, decoder 230, modem 250, DVR unit 260, and memory 270 based on user input (e.g., input received from customer 120 via a remote control device, not shown). Modem 250 may send and receive interactive data (e.g., EPG data) that may be processed by processing unit 240. Modem 250 may also act as a network interface for connecting STB 105 to network 115, such that STB 105 may communicate, via modem 250 with server(s) 125 or, in an implementation in which self-help media DB 135 is stored external to STB 105, to the remote network device that stores DB 135. DVR unit 260 may digitally record, and store, audio and video content associated with the particular TV program decoded by decoder 230. Memory 270 may include one or more memory devices that store data and instructions associated with the operation of STB 105. The instruction stored in memory 270 may be executed by processing unit 240 to perform various STB functions. For example, in one implementation, memory 270 may include a memory device(s) that stores self-help media DB 135 and instructions associated with self-help widget 130.

The configuration of components of STB 105 in FIG. 2 is for illustrative purposes only. Other configurations may be implemented. STB 105 may include additional, fewer and/or different components than those depicted in FIG. 2.

Figure 3:
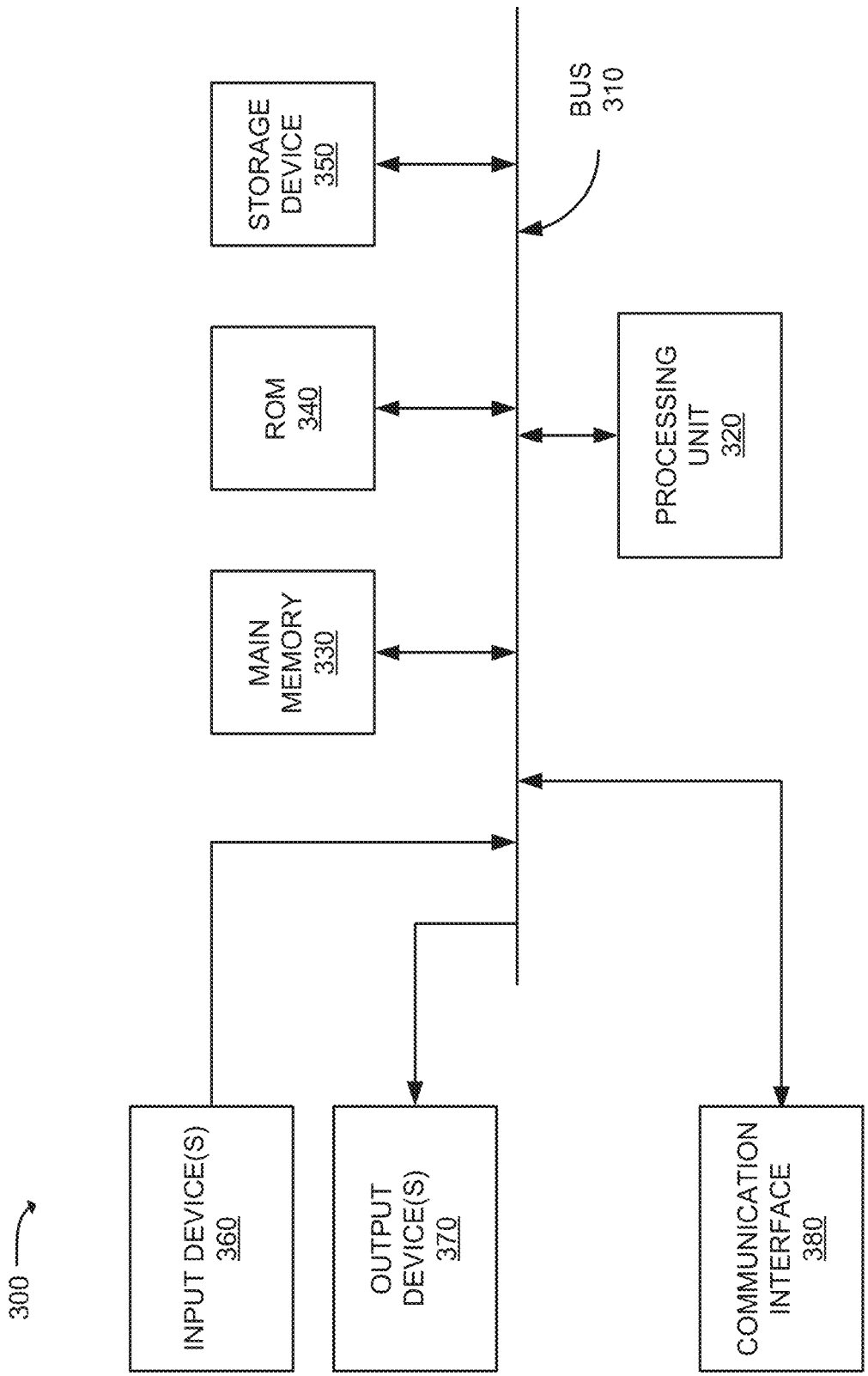
FIG. 3 is a diagram of exemplary components of a network device 300 that may correspond to the server and/or the database of FIG. 1.

FIG. 3 is a diagram of exemplary components of a network device 300. Server(s) 125 may be configured identically to, or similar to, network device 300 shown in FIG. 3. In an exemplary implementation in which self-help media DB 135 is stored in a stand-alone device that is physically separate from STB 105, a network device that is configured identically to, or similar to, network device 300 may store self-help media DB 135. Network device 300 may include a bus 310, a processing unit 320, a main memory 330, a read only memory (ROM) 340, a storage device 350, an input device(s) 360, an output device(s) 370, and a communication interface 380. Bus 310 may include a path that permits communication among the elements of network device 300.

Processing unit 320 may include one or more processors or microprocessors, or processing logic, which interprets and executes instructions. Main memory 330 may include a random access memory (RAM) or another type of dynamic storage device that stores information and instructions for execution by processing unit 320. ROM 340 may include a ROM device or another type of static storage device that stores static information and instructions for use by processing unit 320. Storage device 350 may include a magnetic and/or optical recording medium. Main memory 330, ROM 340, and storage device 350 may each be referred to herein as a "tangible non-transient computer-readable medium."

Input device 360 may include one or more mechanisms that permit a user/operator to input information to network device 300, such as, for example, a keypad or a keyboard, a display with a touch sensitive panel, voice recognition and/or biometric mechanisms, etc. Output device 370 may include one or more mechanisms that output information to the user/operator, including a display, a speaker, etc. Communication interface 380 may include any type of transceiver that enables network device 300 to communicate with other devices and/or systems. For example, communication interface 380 may include wired and/or wireless transceivers for communicating via network 115.

The configuration of components of network device 300 in FIG. 3 is for illustrative purposes only. Other configurations may be implemented. Network device 300 may include additional, fewer and/or different components than those depicted in FIG. 3.

Figure 4:
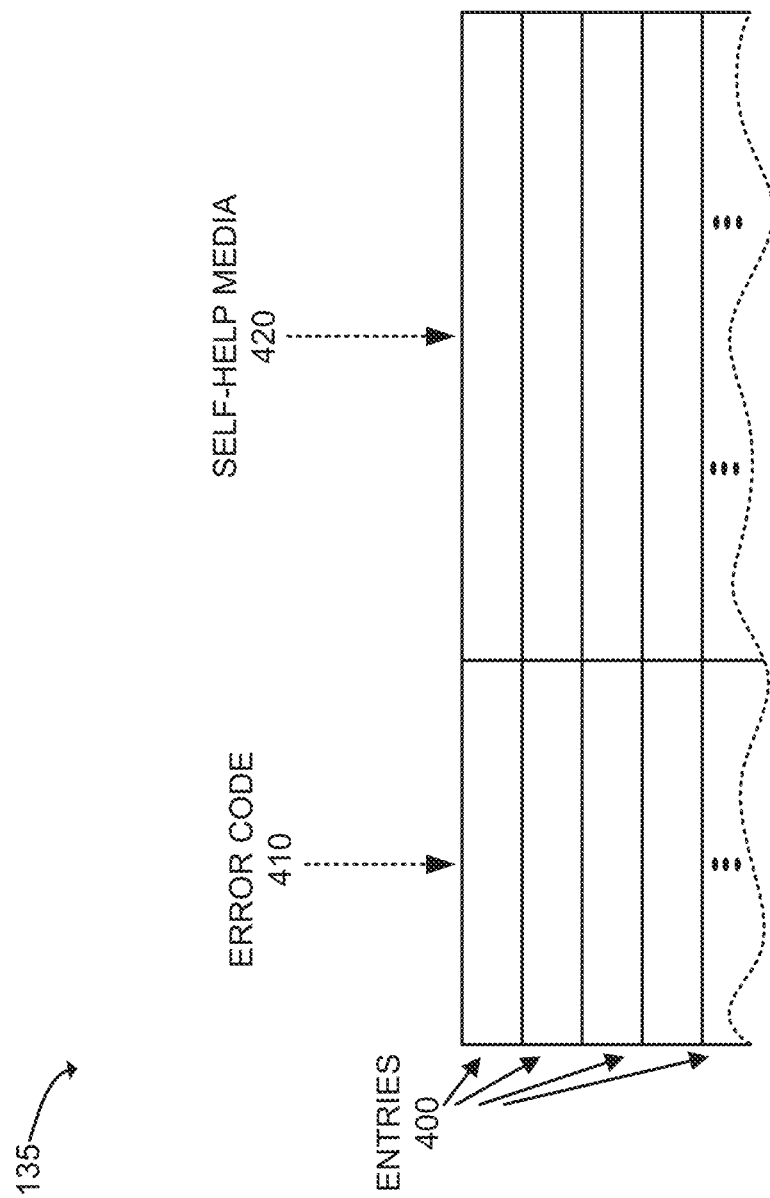
FIG. 4 depicts an exemplary data structure that corresponds to the self-help media database of FIG. 1.

FIG. 4 depicts an exemplary data structure that corresponds to self-help media DB 135. Self-help media DB 135 is shown in FIG. 4 as a tabular data structure. However, other types of data structures may alternatively be used. Self-help media DB 135 may include multiple entries 400, each of which includes an error code field 410, and a self-help media field 420. DB 135 may be stored in memory 270 of STB 105, or in a network device connected to network 115 which STB 105 may access via network 115.

Error code field 410 stores an error code that uniquely identifies a single specific STB error or problem. Each field 410 stores a different error code for STB 105. For example, field 410 may store an error code that identifies the occurrence of a missing Interactive Media Guide (IMG), an error code that identifies the occurrence of a failure of DVR unit 260 of STB 105 to record, etc.

Self-help media field 420 stores one or more media items that include instructions for attempting to troubleshoot and resolve the STB error or problem identified by the error code stored in the corresponding error code field 410. The one or more media items may include one or more items of audio and/or video media, or other types of media. For example, the one or more media items may include one or more videos that include audio and visual instructions for resolving the STB error or problem identified by the error code.

The number and content of the fields of the tabular data structure of DB 135 illustrated in FIG. 4 is for illustrative purposes. Other data structures having a different structure or fewer, more, and/or one or more different types of fields may be implemented as compared to that depicted in FIG. 4.

Figure 5:
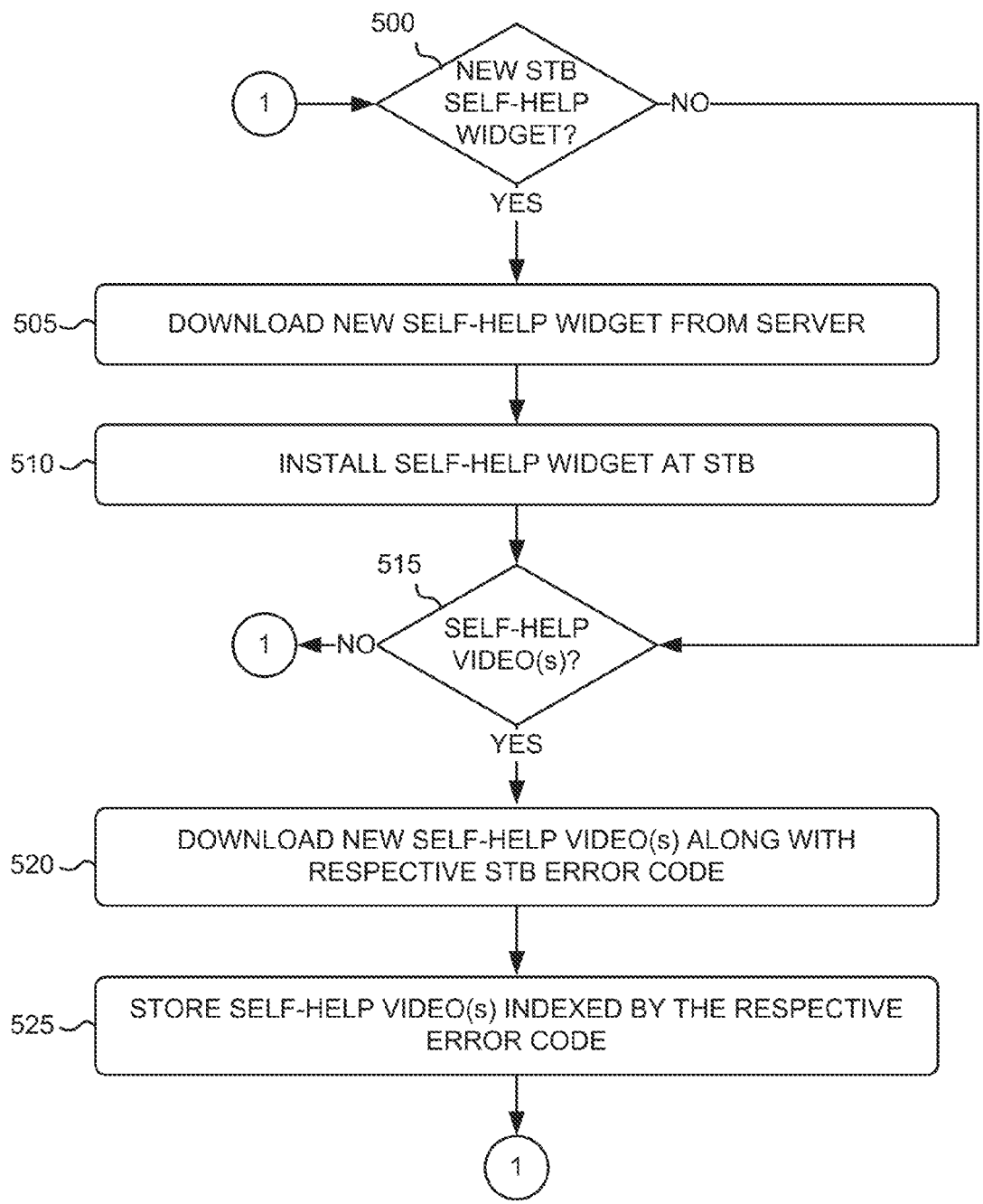
FIG. 5 is a flow diagram that illustrates an exemplary process for downloading a self-help widget, and installing it at a set-top box, and for downloading self-help videos and storing them in a data structure.

FIG. 5 is a flow diagram that illustrates an exemplary process for downloading a self-help widget, and installing it at STB 105, and for downloading self-help videos and storing them in a data structure. The exemplary process of FIG. 5 may be implemented by STB 105 in conjunction with server(s) 125. The exemplary process of FIG. 5 is described below with respect to the messaging diagram of FIG. 6.

The exemplary process may include STB 105 determining whether a new STB self-help widget needs to be downloaded from server(s) 125 (block 500). For example, when STB 105 initially turns on (i.e., boots up), STB 105 may determine whether a self-help widget 130 is currently installed at STB 105, or whether a most recent version of self-help widget 130 is installed at STB 105 (i.e., the self-help widget 130 installed at STB 105 may be out-of-date). Additionally, or in an alternative embodiment, STB 105 may, at certain intervals (e.g., periodically) during operation of STB 105, determine whether a self-help widget 130 is currently installed at STB 105, or whether a most recent version of self-help widget 130 is installed at STB 105.

Figure 6:
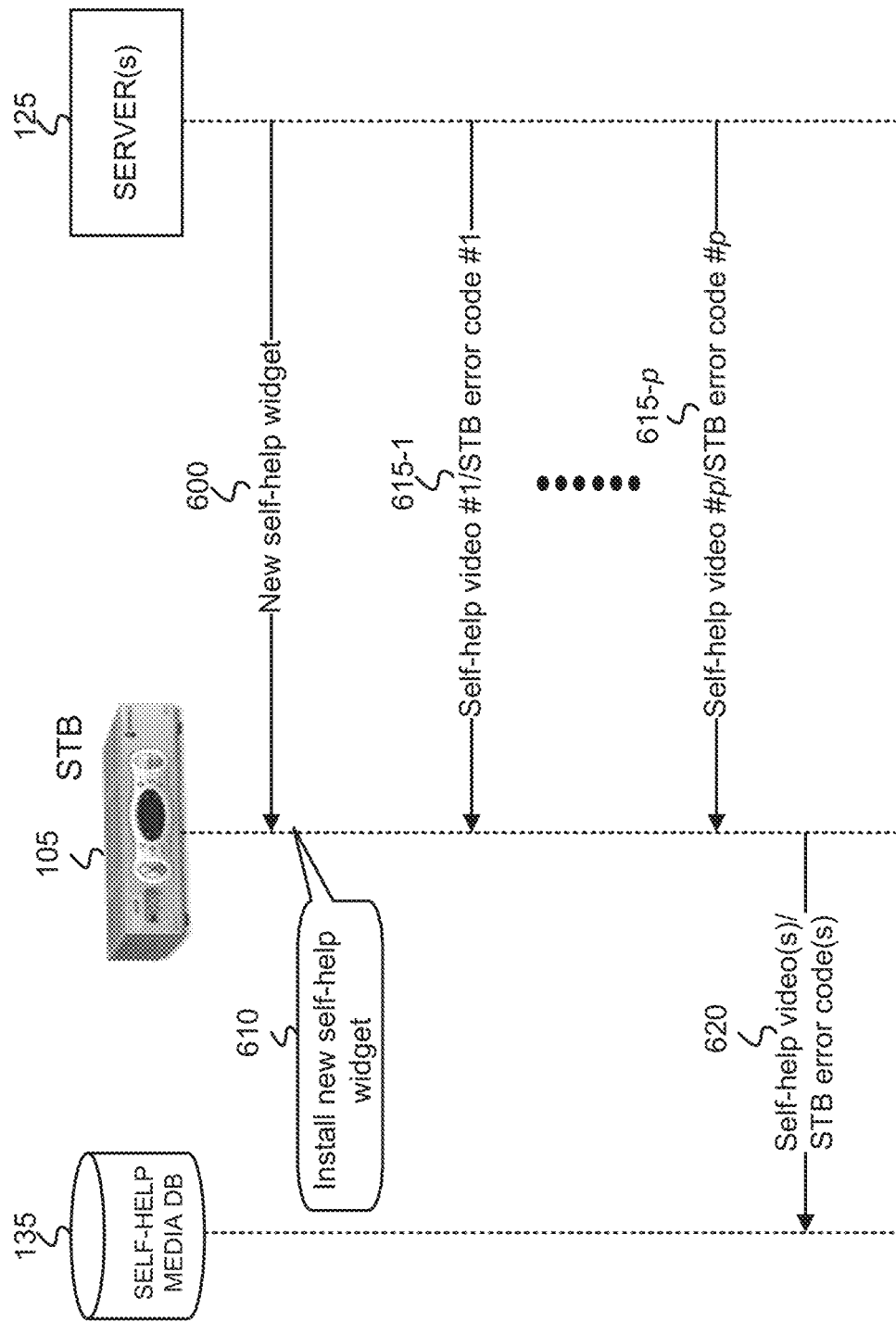
FIG. 6 is an exemplary messaging diagram associated with the process of FIG. 5.

STB 105 downloads a new self-help widget from server(s) 125 (block 505) and installs the downloaded self-help widget (block 510). The new self-help widget may be a first self-help widget downloaded at STB 105 at, for example, the time of STB 105's very first power up, or the new self-help widget may be a most recent version of the widget that is stored at server(s) 125. The self-help widget 130 may be "pushed" from server(s) 125 to STB 105, or STB 105 may "pull" the self-help widget 130 from server(s) 125. When "pushed" from server(s) 125, server(s) 125 may unilaterally initiate the delivery of self-help widget 130 to STB 105. When "pulled" from server(s) 125, STB 105 may request the delivery of self-help widget 130 from server(s) 125. FIG. 6 depicts server(s) 125 sending a new self-help widget 600 to STB 105.

FIG. 6 depicts STB 105 installing 610 the new self-help widget received 600 from server(s) 125. STB 105 determines if there are self-help videos that need to be downloaded from server(s) 125 (block 515). In one implementation, a notification that one or more new self-help videos are available at server(s) 125 may be sent from server(s) 125 to STB 105 at the initiative of server(s) 125. For example, server(s) 125 may periodically evaluate the existence of new self-help videos, or revised versions of existing self-help videos, and send a notification to STB 105 that self-help videos need to be downloaded from server(s) 125. Alternatively, server(s) 125 may determine the existing of new self-help videos, or revised versions of existing self-help videos, at the time that they become available at server(s) 125, and sends a notification to STB 105 at that time indicating that self-help videos need to be downloaded from server(s) 125.

In another implementation, STB 105 may send a request to server(s) 125 inquiring whether any new self-help videos, or revised versions of existing self-help videos, are available. STB 105 may send a request periodically, or upon the occurrence of certain events (e.g., STB power-up). Upon receipt of the request, server(s) 125 may check to identify the existence of any new self-help videos, or revised versions of existing self-help videos, and may send a notification to STB 105 if any are identified.

STB 105 downloads a new self-help video(s) from server(s) 125, along with a respective error code (block 520). When each self-help video is stored at server(s) 125, a respective error code is stored with the self-help video. The error code is derived from a set of error codes used by operational software of STB 105 to identify the occurrence of errors or problems at STB 105. FIG. 6 depicts STB 105 downloading self-help videos 615-1 through 615-p from server(s) 125.

STB 105 stores the self-help video(s) in self-help media DB 135 indexed by a respective error code (block 525). For each self-help video downloaded from server(s) 125, STB 105 stores its error code in an error code field 410 of an entry 400 of DB 135, and stores the self-help video in a corresponding self-help media field 420 of DB 135. FIG. 6 depicts STB 105 storing 620 the error codes and self-help videos in self-help media DB 135.

The exemplary process of FIG. 5 may be repeated by STB 105 for each new or updated self-help widget and new and updated self-help video available at server(s) 125.

Figure 7:
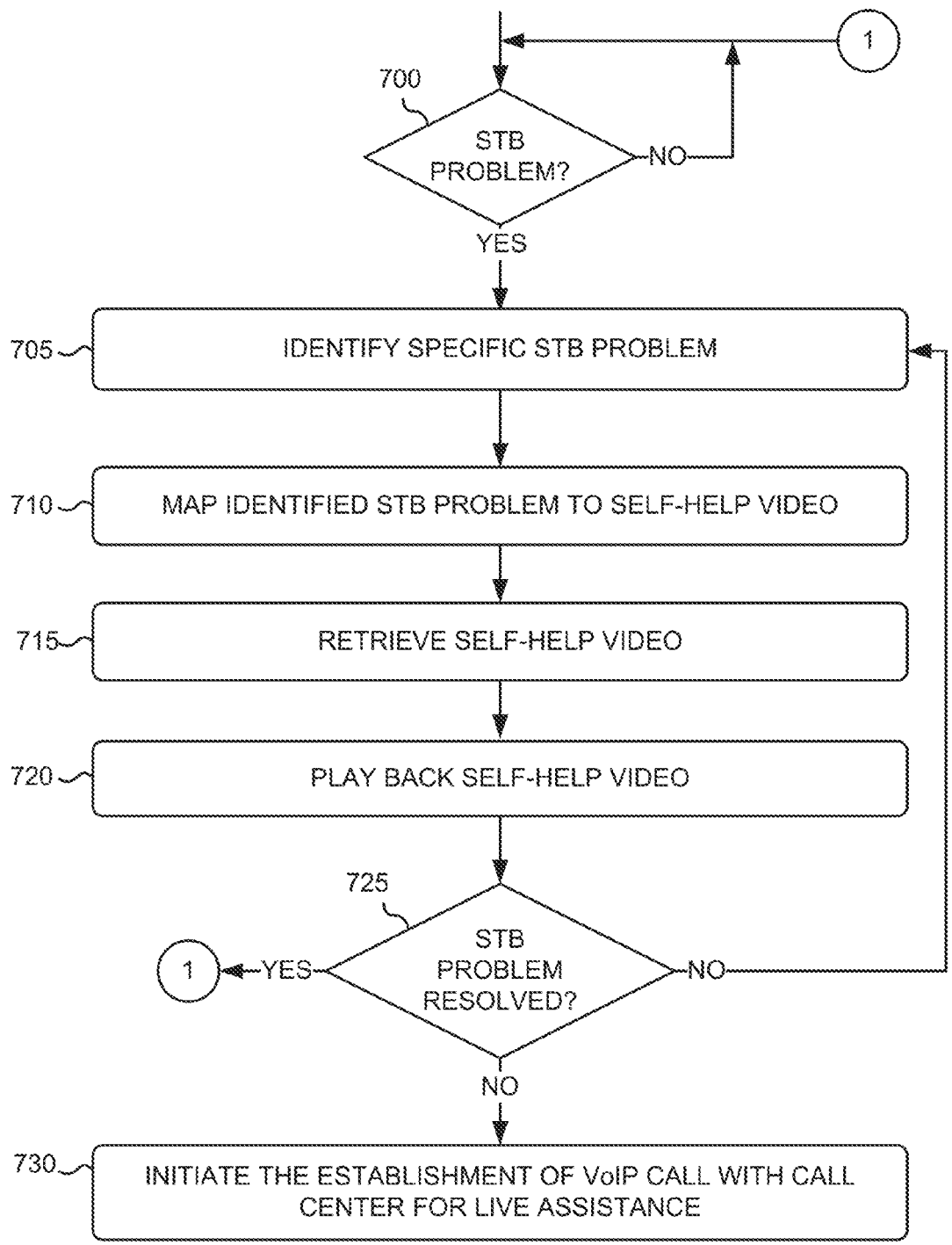
FIG. 7 is a flow diagram that illustrates an exemplary process for automatically playing back a self-help video based on the identification of a set-top box error or problem at the set-top box.

FIG. 7 is a flow diagram that illustrates an exemplary process for playing back a self-help video based on the identification of the STB error or problem at STB 105. The exemplary process of FIG. 7 may be implemented by STB 105. The exemplary process of FIG. 7 is described below with respect to FIGS. 8 and 9.

The exemplary process includes STB 105 identifying whether there is a STB error or problem (block 700). During power-up, or during operation of STB 105, an error or problem may occur at STB 105. The error or problem may involve the actual operation of STB 105, or may involve external conditions or events that impact STB 105 (e.g., STB 105 becomes disconnected from network 115).

STB 105 identifies the specific STB error or problem (block 705). STB 105 may include software that automatically determines the STB error or problem that is occurring, and which automatically assigns an error code to the STB error or problem. For example, a missing Interactive Media Guide (IMG) may be identified with an error code "100," whereas a failure of DVR unit 260 of STB 105 to record may be identified with an error code "150." STB 105 may, therefore, include a data structure that maps STB errors or problems to error codes.

STB 105 maps, using self-help media DB 135, the identified STB error or problem to a self-help video (block 710) and retrieves the self-help video from DB 135 (block 715). Using the error code identified in block 705, STB 105 indexes DB 135 to identify an entry 400 storing an error code in field 410 that matches the error code identified it block 705. STB retrieves the corresponding self-help video from self-help media field 420 of the identified entry 400 of DB 135.

Figure 8:
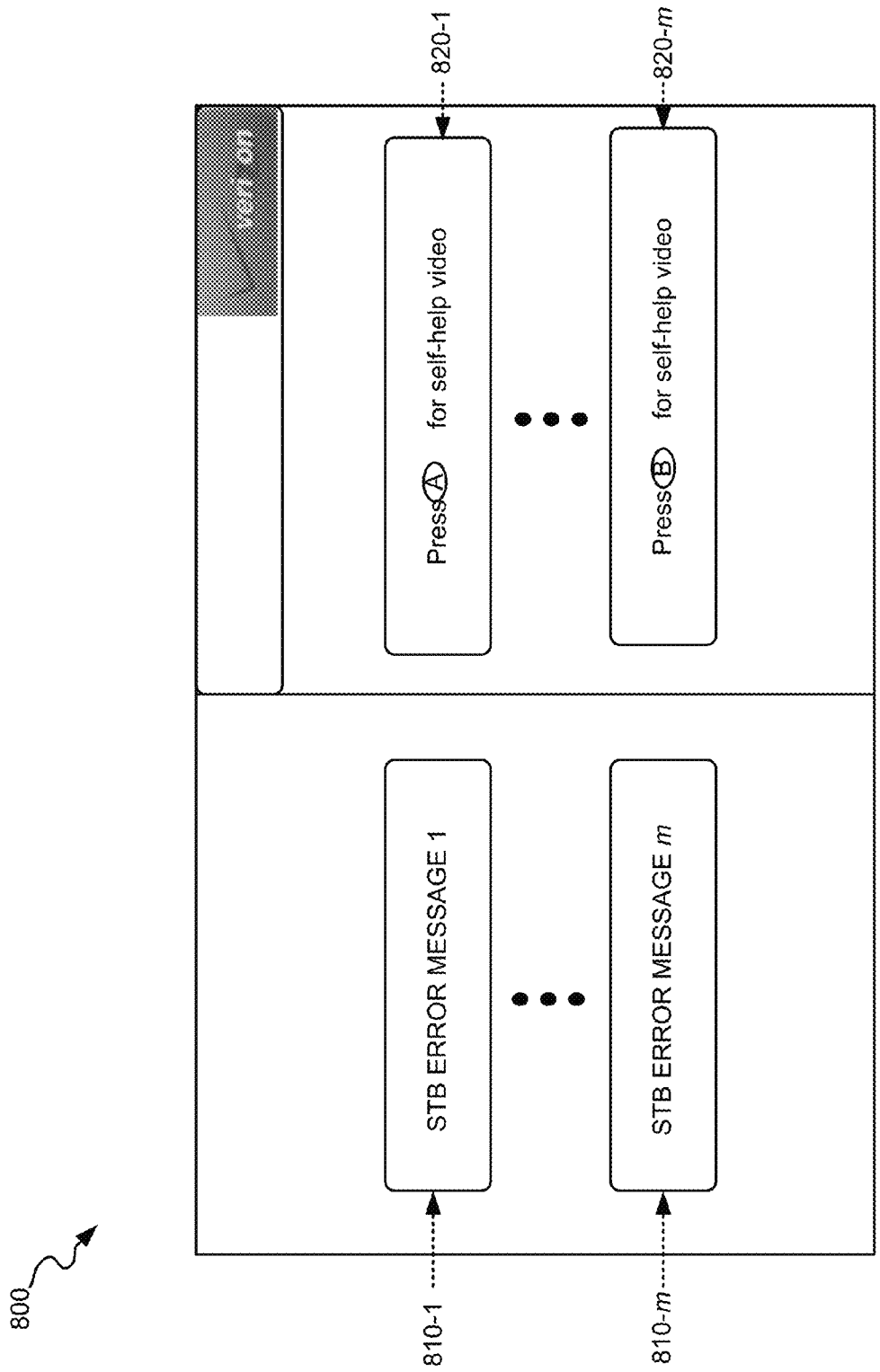
FIG. 8 is a diagram of an exemplary user interface associated with the process of FIG. 7.

FIG. 8 depicts a user interface 800 generated by STB 105 that presents error messages 810-1 through 810-m that each identify a respective STB error or problem that has occurred. User interface 800 may further include a self-help video selector 820-1 through 820-m for respective error messages 810-1 through 810-m. For example, user 120 may press "A" (via a remote control device associated with STB 105) of self-help video selector 820-1, to select playback of the self-help video associated with error message 810-1. In other implementations, the self-help video corresponding to the identified STB error or problem may be automatically played back without user interaction via user interface 800 of STB 105.

Figure 9:
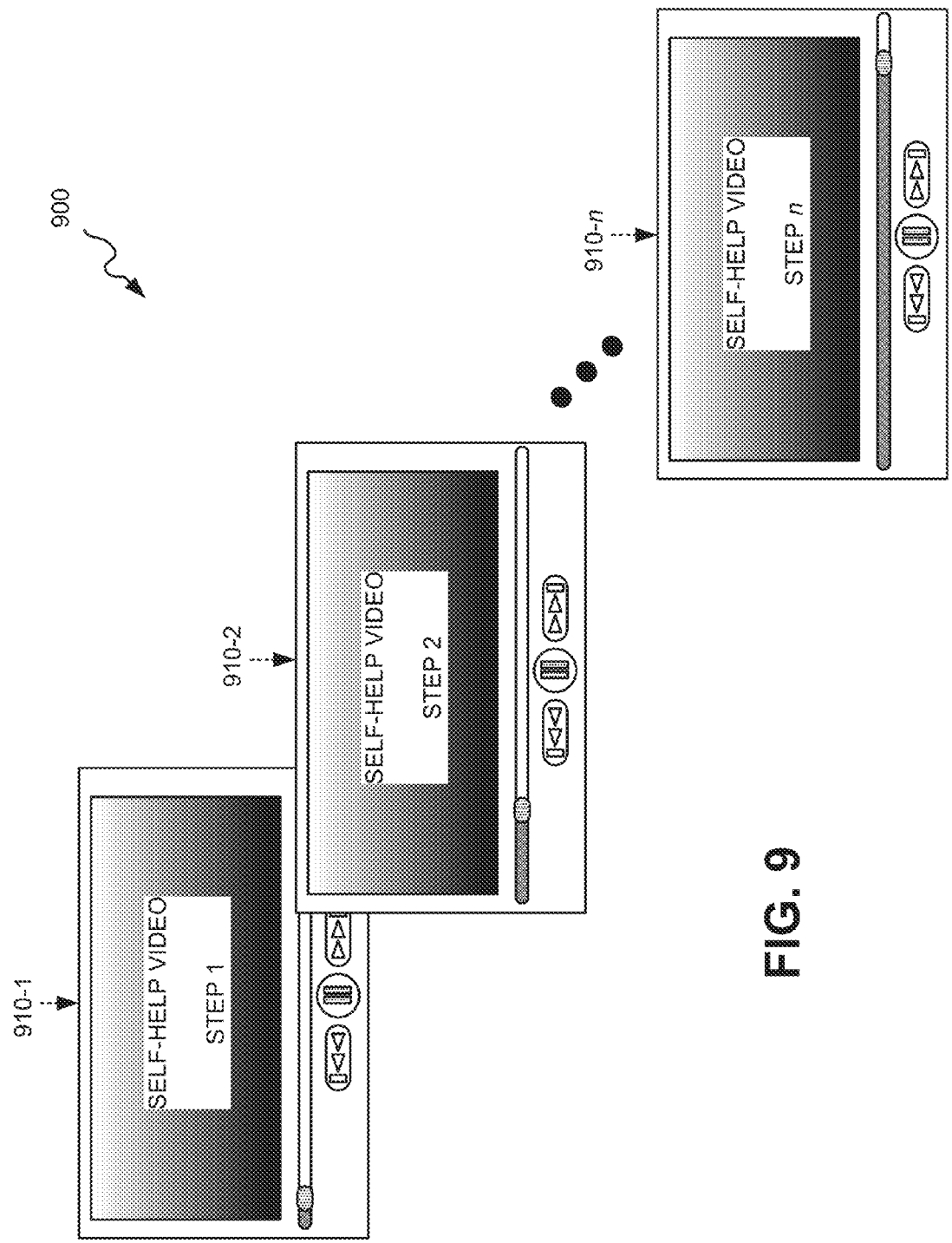
FIG. 9 is a diagram depicting playback of a self-help video.

STB 105 plays back the retrieved self-help video (block 720). FIG. 9 depicts a self-help video 900 being played back by STB 105 (not shown), where different steps in the STB error correction process are depicted at different instances of time 910-1, 910-2 . . . 910-n. As shown in FIG. 9, step 1 of self-help video 900 is shown at time instant 910-1, step 2 is shown at time instant 910-2, and step n is shown at time instant 910-*n*. During playback of the self-help video, the user 120 at STB 105 follows the steps in the self-help video to attempt to troubleshoot and correct the previously identified STB error or problem.

STB 105 determines if the STB error or problem has been resolved during playback of the self-help video (block 725). By following the corrective steps presented in the self-help video played back by STB 105, user 120 may resolve the STB error such that STB 105 is again operating normally. If the STB error or problem has not been resolved (NO, right side—block 725), then the exemplary process returns to block 705 with STB 105 making another attempt to identify the specific STB error or problem. If the STB error or problem has been resolved (YES—block 725), then the exemplary process may return to block 700 with STB 105 determining whether another, different STB error or problem has occurred.

In an alternative embodiment, if the STB error or problem has not been resolved (NO, bottom—block 725), then STB 105 may initiate the establishment of a Voice over Internet Protocol (VoIP) call with a call center for live assistance in resolving the STB error or problem (block 730). In one implementation in which STB 105 includes an associated microphone for detecting audio from user 120 and a speaker for presenting audio to user 120, the VoIP call may be initiated directly from STB 105 via self-help widget 130. In another implementation, self-help widget 130 at STB 105 may initiate the VoIP call between a known phone (e.g., PSTN, cable, or mobile phone) associated with user 120. Once the VoIP call is established between user 120 and the call center, user 120 can obtain verbal instructions from the operator at the call center for resolving the identified STB error or problem, or the call center operator may refer the user 120 to technical assistance to possibly schedule an in-person visit by a technician.

The exemplary process of FIG. 7 may, in one implementation, run continuously as a background process while STB 105 is turned on. In this implementation, the exemplary process of FIG. 7 may run in parallel with other processes being executed by STB 105.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with regard to FIGS. 5 and 7, the order of the blocks may be modified in other embodiments. Further, non-dependent blocks may be performed parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   determining, by a set-top box (STB), an occurrence of a first STB error during operation of the STB, wherein the STB receives content via a network;
   identifying, by the STB, a first error code that corresponds to the first STB error;
   mapping, by the STB, the first error code to a first self-help video of a plurality of self-help videos stored at the STB;
   determining, by the STB, an occurrence of a second STB error during operation of the STB;
   identifying, by the STB, a second error code that corresponds to the second STB error;
   mapping, by the STB, the second error code to a second self-help video of the plurality of self-help videos stored at the STB, wherein the second self-help video is different than the first self-help video;
   generating, by the STB, a user interface for display via a display device coupled to the STB, wherein the generated user interface displays a list comprising a plurality of error messages;
   presenting, by the STB via the user interface, a first error message, within the list comprising the plurality of error messages, that identifies the first STB error;
   presenting, by the STB via the user interface, a first self-help video selector in association with the first error message within the list comprising the plurality of error messages, wherein the first self-help video selector identifies a first control button of a remote control device associated with the STB that, if selected by a STB user, causes playing of the first self-help video;
   presenting, by the STB via the user interface, a second error message, within the list comprising the plurality of error messages, that identifies the second STB error;
   presenting, by the STB via the user interface, a second self-help video selector in association with the second error message within the list comprising the plurality of error messages, wherein the second self-help video selector identifies a second control button of the remote control device associated with the STB that, if selected by the STB user, causes playing of the second self-help video;
   receiving, at the STB from the remote control device, selection of the first control button or the second control button of the remote control device;
   playing, by the STB, the first self-help video when selection of the first control button of the remote control device is received at the STB;
   determining, by the STB, that the first STB error was not resolved during the playing of the first self-help video;
   initiating, by the STB responsive to the determination that the first STB error was not resolved, establishment of a first voice call with a call center; and
   playing, by the STB, the second self-help video when selection of the second control button of the remote control device is received at the STB.

2. The method of claim 1, wherein the operation of the STB comprises presentation of the content via the display device.

3. The method of claim 1, wherein the first STB error comprises an error associated with the operation of the STB when presenting the content via the display device.

4. The method of claim 1, wherein the content comprises at least one of audio or video media.

5. The method of claim 1, wherein the first self-help video comprises a first user interactive video that includes text, audio and video instructions for correcting the first STB error.

6. The method of claim 5, wherein the second self-help video comprises a second user interactive video that includes text, audio and video instructions for correcting the second STB error.

7. The method of claim 1, further comprising:
retrieving, if selection of the first control button of the remote control device is received at the STB, the first self-help video of the plurality of self-help videos from a memory of the STB, or from a remote device via a network interface of the STB.

8. The method of claim 1, further comprising:
determining that the second STB error was not resolved during the playing of the second self-help video; and
initiating, responsive to the determination that the second STB error was not resolved, establishment of a second voice call with the call center.

9. The method of claim 1, wherein initiating the establishment of the first voice call with the call center comprises:
initiating the first voice call as a Voice over Internet Protocol (VoIP) call directly from the STB to the call center.

10. The method of claim 1, wherein initiating the establishment of the first voice call with the call center comprises:
initiating the first voice call as a Voice over Internet Protocol (VoIP) call between a phone associated with the STB user and the call center, wherein the phone is a different device than the STB.

11. A set-top box (STB), comprising:
circuitry configured to receive content via a network and provide the content for presentation via a display device coupled to the STB; and
a processing unit configured to:
determine an occurrence of a first STB error during operation of the STB;
identify a first error code that corresponds to the first STB error;
map the first error code to a first self-help video of a plurality of self-help videos stored at the STB;
determine an occurrence of a second STB error during operation of the STB;
identify a second error code that corresponds to the second STB error;
map the second error code to a second self-help video of the plurality of self-help videos stored at the STB, wherein the second self-help video is different than the first self-help video;
generate a user interface for display via a display device coupled to the STB, wherein the generated user interface displays a list comprising a plurality of error messages;
present, via the user interface, a first error message, within the list comprising the plurality of error messages, that identifies the first STB error;
present, via the user interface, a first self-help video selector in association with the first error message within the list comprising the plurality of error messages, wherein the first self-help video selector identifies a first control button of a remote control device associated with the STB that, if selected by a STB user, causes playing of the first self-help video;

present, via the user interface, a second error message, within the list comprising the plurality of error messages, that identifies the second STB error;
present, via the user interface, a second self-help video selector in association with the second error message within the list comprising the plurality of error messages, wherein the second self-help video selector identifies a second control button of the remote control device associated with the STB that, if selected by the STB user, causes playing of the second self-help video;
receive, from the remote control device, selection of the first control button or the second control button of the remote control device;
play the first self-help video, via the display device, if selection of the first control button of the remote control device is received at the STB;
play the second self-help video, via the display device, if selection of the second control button of the remote control device is received at the STB;
determine, subsequent to playing of the first self-help video, whether the first STB error was resolved during the playing of the first self-help video; and
initiate, responsive to the first STB error not being resolved during the playing of the first self-help video, establishment of a first voice call with a call center.

12. The STB of claim 11, wherein the first STB error comprises an error associated with the operation of the STB when presenting the content via the display device.

13. The STB of claim 11, wherein the first self-help video comprises a first user interactive video that includes text, audio and video instructions for correcting the first STB error, wherein the second self-help video comprises a second user interactive video that includes text, audio and video instructions for correcting the second STB error.

14. The STB of claim 11, wherein the processing unit is further configured to:
retrieve, if selection of the first control button of the remote control device is received at the STB, the first self-help video of the plurality of self-help videos from a memory of the STB, or from a remote device via a network interface of the STB.

15. The STB of claim 11, wherein the processing unit is further configured to:
determine that the second STB error was not resolved during the playing of the second self-help video; and
initiate, responsive to the determination that the second STB error was not resolved, establishment of a second voice call with the call center.

16. The STB of claim 11, wherein, when initiating the establishment of the first voice call with the call center, the processing unit is further configured to:
initiate the first voice call as a Voice over Internet Protocol (VoIP) call directly from the STB to the call center.

17. The STB of claim 11, wherein, when initiating the establishment of the first voice call with the call center, the processing unit is further configured to:
initiate the first voice call as a Voice over Internet Protocol (VoIP) call between a phone associated with the STB user and the call center, wherein the phone is a different device than the STB.

18. A set-top box (STB), comprising:
a network interface configured to connect the STB to a network;

circuitry configured to receive content via the network and provide the content for presentation via a display device coupled to the STB; and a processing unit configured to:

store, in a database, a set of self-help videos related to troubleshooting and resolving STB errors or problems, send, via the network interface to an external server, a request inquiring whether any new self-help video, or a revised version of any self-help video of the set of self-help videos, are available at the external server, receive, via the network interface responsive to the request, a notification from the external server that identifies a new self-help video, or a revised version of a self-help video of the set of self-help videos, as being available, download, from the external server via the network interface based on the notification, the new self-help video, or the revised version of the self-help video of the set of self-help videos, along with an error code identifying a specific STB error or problem, wherein the new self-help video or the revised version of the self-help video of the set of self-help videos contains instructions for attempting to troubleshoot and resolve the specific STB error or problem, store, in the database indexed by the error code, the new self-help video, or the revised version of the self-help video of the set of self-help videos, play, responsive to user selection, the new self-help video or the revised version of the self-help video, determine that the specific STB error or problem was not resolved during the playing of the new self-help video or the revised version of the self-help video, and initiate, responsive to the determination that the specific STB error or problem was not resolved, establishment of a voice call with a call center.

19. The STB of claim 18, wherein to initiate the establishment of the voice call with the call center, the processing unit is further configured to:

initiate the voice call as a Voice over Internet Protocol (VOIP) call directly from the STB to the call center.

20. The STB of claim 18, wherein to initiate the establishment of the voice call with the call center, the processing unit is further configured to:

initiate the voice call as a Voice over Internet Protocol (VOIP) call between the call center and a phone associated with a user of the STB.

* * * * *